United States Patent
Trifonov et al.

(10) Patent No.: US 7,218,795 B2
(45) Date of Patent: May 15, 2007

(54) ASSISTED SCRATCH REMOVAL

(75) Inventors: Mikhail Ivanovich Trifonov, Sosnovyi Bor (RU); Olga Vadimovna Sharonova, Saint Petersburg (RU); Kryzstof Antoni Zaklika, Saint Paul, MN (US)

(73) Assignee: Corel Corporation, Ottawa, Ontario (CA)

( * ) Notice: Subject to any disclaimer, the term of this patent is extended or adjusted under 35 U.S.C. 154(b) by 813 days.

(21) Appl. No.: 09/900,479

(22) Filed: Jul. 6, 2001

(65) Prior Publication Data

US 2003/0012452 A1 Jan. 16, 2003

(51) Int. Cl.
*G06K 9/40* (2006.01)
*G06K 9/46* (2006.01)

(52) U.S. Cl. ...................... 382/279; 382/190
(58) Field of Classification Search ............... 382/275, 382/254, 169, 140, 298
See application file for complete search history.

(56) References Cited

U.S. PATENT DOCUMENTS 5,881,182 A * 3/1999 Fiete et al. ................. 382/275
6,408,109 B1 * 6/2002 Silver et al. ................ 382/300

OTHER PUBLICATIONS

"Local Radial-Angular Transformation of Images" by M.I. Trifonov and P.A. Medinnikov; Jul. 2, 1990.*
Schallauer, A., et al., "Automatic Restoration Algorithms for 35 mm Film," *Videre* vol. 1 (3) Summer 1999; 60-85.
Bertalmio, G., et al., "Image Inpainting," *Preprint* vol. 1655, Institute for Mathematics and its Applications, University of Minnesota, Dec. 1999; 1-10.
Hirani, A. N., et al., "Combining Frequency and Spatial Domain Information for Fast Interactive Image Noise Removal," *Computer Graphics Proceedings*, Annual Conference Series, 1996; 269-279.
Steger, C., "An Unbiased Detector of Curvilinear Structures," Technical Report *FGBV* 96-03, Forschungsgruppe Bildverstehen (FG BV), Informatik IX Technische Universität München, 1996; 1-30.
Strohmer, T., "A Levinson-Galerkin Algorithm for Regularized Trigonoetric Approximation," http://tyche.mat.univie.ac.at/papers/inpress/trigappr.html.
Zatschler, H., "M4R Prohject-Radial Basis Functions," http://www.doc.ic.ac.uk/~hz3/m4project/m4project.html.
Hirani, A. N., et al., "Combining Frequency and Spatial Domain Information for Fast Interactive Image Noise Removal," Proceedings of *SIGGRAPH*, 199; 269-276.
Ballester, C., et al., "A Variational Model for Filling-In," http://www.ceremade.dauphine.fr/reseaux/TMR-viscosite/preprints.html.
Chan, T. F., et al., "Morphologically Invariant PDE Inpaintings," *Computational and Applied Mathematics Report* 01-15, UCLA May 2001; 1-14.
Chan, T. F., et al., "Non-Texture Inpainting by curvature-Driven Diffusions (CDD)," *Computational and Applied Mathematics Report* 00-35 UCLA Sep. 2000; 1-16.

* cited by examiner

*Primary Examiner*—Bhavesh M. Mehta
*Assistant Examiner*—Wes Tucker
(74) *Attorney, Agent, or Firm*—Hensley Kim & Edgington LLC

(57) ABSTRACT

Line defects are removed from an image by providing image data in digital form, analyzing segments of the image data as groups of pixels, detecting line defects in the image by application of a line detector, such as a local radial angular transform, and adjusting the image data to correct the detected line defects within the determined limits.

36 Claims, 2 Drawing Sheets

ASSISTED SCRATCH REMOVAL

BACKGROUND OF THE INVENTION

1. Field of the Invention

The present invention relates to a method for the detection and removal of line-like defects from an image. The invention relates to a process of detecting the defects using mathematical procedures and then correcting the detected defects.

2. Background of the Art

As a result of repeated handling or accident, old photographs often develop scratches. They also acquire defects resulting from material failure with age, such as cracking of surface coatings or laminations placed over the surface of the picture. The photograph may also become creased through careless handling, leading to a surface pattern resembling a scratch. Such scratch patterns are in general not simple straight lines. Instead they can be quite complex, having curved as well as straight sections with intersections and line junctions. Since the advent of inexpensive and high quality scanners, many old photographs are being digitized. Such images have high sentimental or historical value and there is a strong desire and need to digitally eliminate defects such as scratches from the images.

Much effort has been expended on restoration of cinema films that have undergone damage. An overview of the area can be found in P. Schallauer, A. Pinz and W. Haas, "Automatic restoration algorithms for 35 mm film", Videre, vol. 1, no.3, Summer 1999. This is an electronic journal available on-line from http://mitpress.mit.edu/e-journals/Videre/. Film scratches are usually substantially straight and lie along the film direction. This orientation of the scratches occurs because the scratches are usually caused by the projector transport mechanism, which lies consistently parallel to the film sprockets, and because scratches caused by trapped dirt during development can move over a few percent of the film width over several frames, again along the path of film movement during development. Compared to the arbitrary scratches that are found in still photographic prints, the scratching of motion picture film is therefore a very restricted form of scratch. Despite this, the authors state that "from an algorithmic point of view, removing defects is an easy task in comparison to detecting them". This position attests to two things: first, detecting even a very specific type of scratch is difficult and, second, correction of films is relatively easy because content can be taken from frames prior to and after the defect. There is, however, no such source of data for a still photo.

In digital image editing software such as, for instance, Paint Shop Pro (Jasc Software, Inc., 7905 Fuller Road, Eden Prairie, Minn., 55344), it is customary to provide a clone tool to repair image defects. This tool is a brush that picks up an undamaged region of the image and allows it to be painted over the damaged portion. Such a tool is effective, but requires considerable skill to produce a natural and seamless result. Moreover, the tool is not helpful when the image contains no area with undamaged content corresponding to that of the damaged area. Other software often provides a "dust and scratch removal" filter where defects are removed with a non-linear filter, such as a median filter. However, since every pixel in the image—not just scratch pixels—can potentially be modified, this technique is of very limited usefulness. For this reason, a number of proposals have been made for improved methods of scratch correction. For example, in M. Bertalmio, G. Sapiro, V. Caselles, and C. Ballester, "Image Inpainting", *Preprint* 1655, Institute for Mathematics and its Applications, University of Minnesota, December 1999 there is described a method of filling-in scratches, which is done in such a way that isophote lines arriving at the region boundaries are completed inside. Though the method is described as fast, because it is iterative, securing the highest quality results is slow. In a paper entitled "Combining Frequency and Spatial Domain Information for Fast Interactive Image Noise Removal", A. N. Hirani and T. Totsuka, *Proceedings of SIGGRAPH* 96, 269–276 (1996) report a method of repairing scratches in textured areas in which the user indicates a region of source texture for patching that is applied to the defect by means of frequency domain analysis. This method can be very effective in some cases but can fail in others. Neither of these improvements provide any way to identify the scratch. In fact, both authors assume that the scratch has previously been defined somehow, presumably by hand.

However, when scratches or other defects are small and plentiful, defining the scratches prior to correcting them becomes a main objective and content of labor. For instance, the work of marking every section of every scratch is roughly equivalent to cloning or painting over the scratch in the first place, so little is gained by subsequent automation. Automatic definition of generalized scratches is not at a satisfactory level. Often knowing whether something is a scratch or not depends on understanding the content of the image, something beyond the ability of current methods dealing with arbitrary images. A need therefore exists for an assisted method of scratch removal that will allow a user to define precisely the defects in an image without needing the labor of tracing each individually and then to perform a correction of the so-defined scratches.

SUMMARY OF THE INVENTION

An aspect of this invention is to provide a means of removing line like defects from an image, without a requirement for manually marking regions upon the image as regions that contain defects, comprising detecting defects with known methods of detecting lines with specific characteristics and then correcting the detected defects. It is a further aspect of the invention to provide a means of removing line like defects from an image, without a requirement for manually marking regions upon the image as regions that contain defects, comprising detecting the defects using a local radial angular transform and then correcting the detected defects.

DETAILED DESCRIPTION OF THE INVENTION

Figure 1:
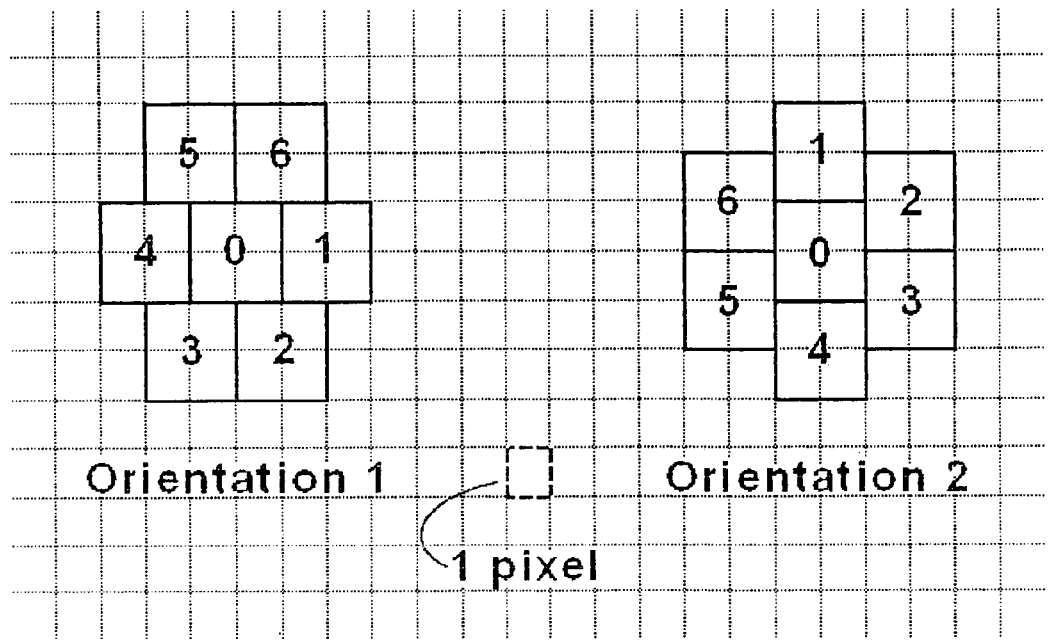
FIG. 1 shows one distribution of groups of pixels in a hexon.

The term line defect or line-like defect is a meaningful term within the practice of the present invention. There are many different types of defects, ranging from dropouts (single pixel defects or failures), color shifts, fading, actual damage to an original figure, etc. No single process sequence can address all of the forms of defects or damage, so individual systems, software, and processes must be devised to address the different defects. Line or line-type defects constitute defects or image damage that is defined as a series of attached or adjacent points that extends over a distance comprising at least a multiple number of pixels (e.g., at least 2, at least 4, at least 6, at least 10, at least 14 pixels), and defining even macroscopic dimensions and visible distances (e.g., at least 1 mm, at least 2 mm, at least 3 mm, at least 5 turn and more) in which there is damage in the image or defects in the data of the image. The 'line' or 'line-type' defect does not have to be a perfectly straight line, but may be jagged, curvilinear, discontinuous or the like. A line may be generally assumed to have a dimension of width that is small (less than 5%, less than 3%, and even less than 1%) of the largest dimension of the image.

A digital image comprises a collection of picture elements or pixels arranged on a regular grid. A gray scale image is represented by a channel of specific brightness values at individual pixel locations. Such a channel may also be represented as a color palette, for example a palette containing 256 shades of gray. A color image contains several channels, usual three or four, that are used to describe the color at a pixel. For example, there may be red, green and blue (RGB) channels, or cyan, magenta, yellow and black (CMYK) channels. Each channel again contains brightness values representing the color at each pixel. Equally, the image may be represented in a color space having a lightness channel along with other channels directly or indirectly representing the hue and saturation components of color. Non-limiting examples of formats for color space definition include the HLS, HSV, YIQ, YUV, YES, CIE L*u*v* and CIE L*a*b* color spaces. All the aforementioned channels are suitable for the practice of the invention.

Current methods of removing from a single still image line-like defects (such as for example, scratches) all have one thing in common, namely that the location of the defect must be marked upon the image in some way. The marking may take several forms. For instance, the pixels forming the defect may be marked individually, for example by means of conventional selection tools such as freehand or lasso tools that outline a selection area or by means of a magic wand tool that selects pixels by color similarity to a target pixel. Subsequently, selected pixels are modified to reduce the visibility of the defect. Alternatively, the approximate region of the defect may be designated, for example by placing a virtual frame upon the image containing at least the pixels of the defect. Subsequently, in the region of the image restricted to the contents of the virtual frame, an attempt is made to classify pixels into defect and non-defect pixels by some means, whereupon the defect pixels are modified to reduce the visibility of the defect. Yet another approach marks the defect indirectly, in the sense that an operator paints a correction directly over the defect pixels but substantially not over other, undamaged pixels of the image. In this case, image pixels are modified unconditionally without regard to their being defect or non-defect pixels and restriction of correction to only defect pixels is accomplished by the operator controlling the location, size and other characteristics of the conceptual brush with which painting is accomplished. With a single defect isolated from other similar image features or a small number of such defects these known approaches to correction of line-like defects may be adequate. However, with many small defects in different regions of the image such methods are impractically laborious, especially when it is recognized that digital images commonly contain at least thousands of pixels and often many millions of pixels. Currently this problem is without a solution.

It is known to clone over scratches (line defects) or, once they are manually marked on the image, to repair them with in-painting, etc. It is also known to manually define the approximate spatial location of a scratch. These approaches require the scratch to be painted on or defined in the spatial domain and not according to its properties. It is known that various software asserts an ability for "dust and scratch" removal, though in practice it cannot cope with extended lines (i.e., long lines). This "dust and scratch" removal is accomplished, for instance, by processing an image with rank order filters or filters with internal thresholds (e.g., despeckle filters), which are applied to every pixel in the image without regard to whether it is a defect or non-defect pixel and so can damage the image features that should remain unmodified. It is known to automatically correct lines in movie frames according to their properties in dependence on information in prior and subsequent frames such as, for example, the absence of a scratch in a subsequent frame or the known location of a scratch in a previous frame. There is no known method of scratch removal in single still images that permits the scratch to be defined and then corrected, where the definition rests on properties other than the spatial location of the scratch.

A novel aspect of this invention is the conception of and provision of means for correcting line-like defects in a single still image that does not require the location of the defect pixels to be manually marked on the surface or area of the image to be corrected. Any conventional means of detecting lines may be used for identifying line-like defects provided they provide a means of selectively detecting lines with different characteristics. Such characteristics may, for example, include the contrast of the line with respect to its surroundings, the orientation of the line, the sharpness of the line edges, the width of the line and the like. Methods of line detection suitable for the practice of this invention may be found, for example, in C. Steger, "An Unbiased Detector of Curvilinear Structures", *Technical Report* FGBV-96-03, Forschungsgruppe Bildverstehen, Informatik IX, Technische Universität München, Germany, 1996 and references therein. Schemes for line detection range from a concentration on local brightness differences in the image, through detection of lines as objects having parallel edges, to more sophisticated techniques. Some of these more sophisticated techniques use the curvature of the brightness of the image for estimation of lines using contours, ridges and ravines and locally fitting the curvature of the image. These methods may be used for the practice of the invention but many of them are of considerable computational complexity. Another aspect of the invention is, therefore, to provide an additional and exemplary method of line defect detection that may be used in a process of correcting line-like defects in an image by detecting these defects without a requirement for manually marking regions upon the image as regions that contain defects, and then correcting the detected defects. This exemplary method is rapid and is capable of characterizing lines by means that include characterization according to whether they are dark or light, by contrast with respect to their surrounds, by width, by length, by orientation and by sharpness of edge definition. The method is based on the local radial angular transform. The listed characteristics are valuable for differentiating a line-like defect, such as scratch, from other image features and this method is accordingly a preferred method in the practice of the invention.

Figure 2:
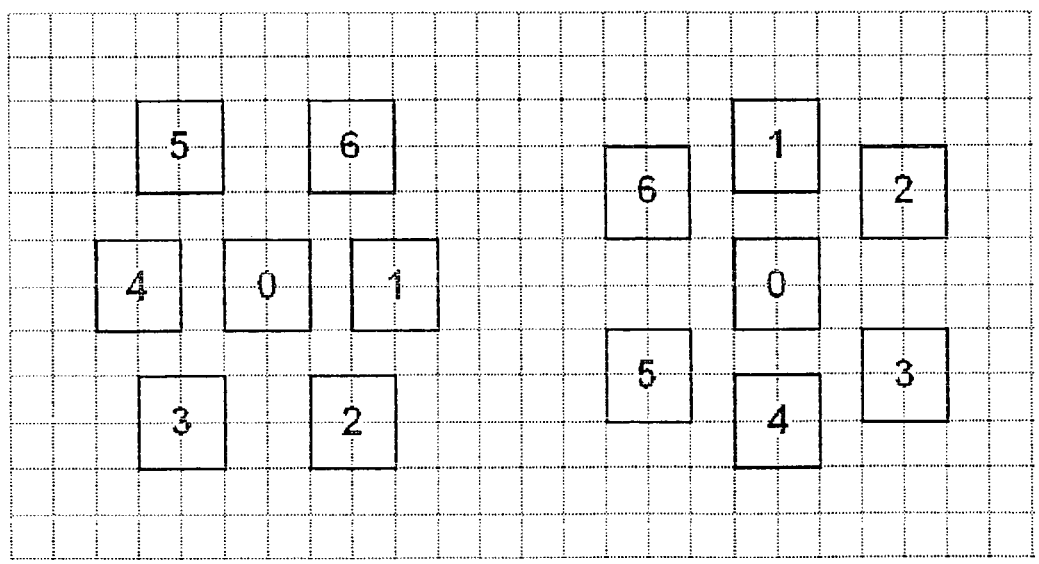
FIG. 2 shows another distribution of groups of pixels in a hexon.
Figure 3:
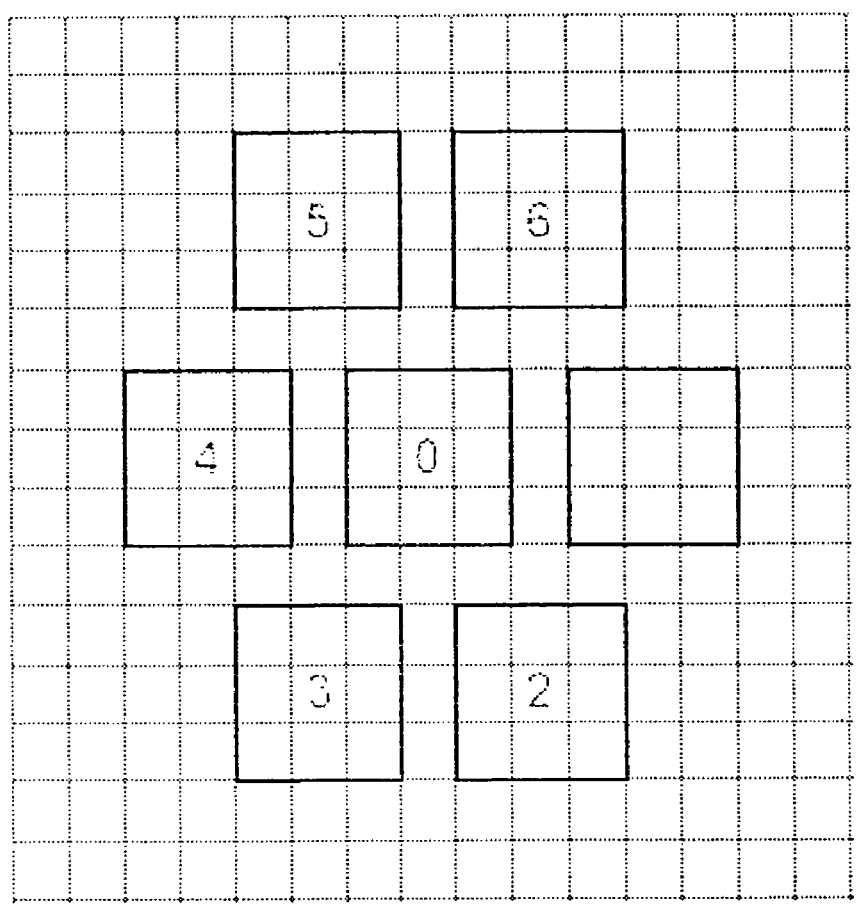
FIG. 3 shows yet another distribution of larger groups of pixels in a hexon.

A co-pending U.S. patent application, Ser. No. 09/897, 736, and being entitled DETECTION OF LINES IN IMAGES, discloses a local radial angular transtion utilizing a hexagonal structure, termed a hexon, that is overlaid over the pixels of the image. Procedures for performing this overlay are described in detail in the co-pending application, which is incorporated herein by reference in its entirety. The hexon consists of a central group of pixels surrounded by six groups of pixels arranged in approximate hexagonal symmetry about the central group. FIG. 1 of this application shows two orientations of one such hexagonal arrangement of pixel groups. FIG. 2 shows a different arrangement of pixel groups in which the groups do not touch. FIG. 3 shows a similar arrangement to that of FIG. 2 but with larger pixel groups.

The numbers shown in the figure identify each of the pixel groups and appear as subscript labels in the following discussion. In an image having any particular brightness values at its pixels, the mean brightness values of the six groups surrounding the central group may be represented as a vector $B=(B_1, B_2, B_3, B_4, B_5, B_6)^T$, where the superscript T denotes a transpose operation that converts a row matrix to a column matrix. A Local Radial Angular (LORA) transform $L\Delta c$ is defined as $c=RB$, where $c=(c_1, c_2, c_3, c_4, c_5, c_6)^T$ is a vector of transformation coefficients. R is a six by six square matrix whose elements are formed according to:

$$R_{km}=(1/6)\|\exp[i(k-1)(m-1)\pi/3]\|, (k,m=1,2\ldots 6)$$

where i is the imaginary unity (i.e., the square root of $-1$), it is the ratio of the circumference to the diameter of a circle, and. k and in are the row and column indices of the matrix elements. The explicit form of $c_3$ is given by:

$$c_3=(0.5/6)(2B_1-B_2-B_3+2B_4-B_5-B_6)+i(0.5/2)(B_2-B_3+B_5-B_6)$$

so that the real and imaginary components of $c_3$ are given, respectively, by:

$$\text{Real}(c_3)=(0.5/6)(2B_1-B_2-B_3+2B_4-B_5-B_6)$$

$$\text{Imaginary}(c_3)=(0.5/2)(B_2-B_3+B_5-B_6)$$

The magnitude of the modulus $|c_3|$ of the transformation coefficient $c_3$ has been found to be an indicator of the presence of a line-like feature in the image lying under the hexon superimposed over the image. There are two values of $|c_3|$ corresponding to the orientations 1 and 2 shown in FIG. 1. These separate values $|c_{13}|$ and $|c_{23}|$ may be combined into a single value $|c_3|$, for instance by taking the larger of the two, taking the square root of the sum of the squares, weighted averages, and the like. The magnitude of $|c_3|$ can be considered the strength of a line response in the image. It is also possible to define a different hexon response, $\delta_3$, which is a measure of the line purity. This hexan response quantity is defined as:

$$\delta_3 = 2|c_3|^2 \Big/ \sum_{k=2}^{k=6}|c_k|^2$$

Other definitions involving weighted functions of the coefficients $c_k$ are also possible. Since coefficients other than $c_3$ respond to image features that are not lines, $\delta_3$ is a measure of the degree to which the $c_3$ response represents a line. There are separate values, $\delta_{13}$ and $\delta_{23}$, of this measure for hexon orientation 1 and hexon orientation 2, respectively (see FIG. 1). These may be combined into a single value of $\delta_3$ by any convenient means, for instance by using the larger value. The $c_3$ coefficient responds to lines that are both dark and light with respect to the background upon which they lie and by default both types of lines are detected. However, it is also possible to selectively detect only light lines or only dark lines. This may be achieved in various ways. For example, the mean brightness or channel value at the quasi-pixels lying closest to the line may be compared to the value of $c_1/6$. Alternatively, the lightness or darkness of a line may be estimated from the real and imaginary parts of the $c_3$ coefficient by comparison to Thresholds $T_1$ and $T_2$ according to the following logic:

if $|\text{Imaginary}(c_3)/\text{Real}(c_3)|\leq T_1$ and $\text{Real}(c_3)>T_2$ then Light if $|\text{Imaginary}(c_3)/\text{Real}(c_3)|>T_1$ and $\text{Real}(c_3)<T_2$ then Light if $|\text{Imaginary}(c_3)/\text{Real}(c_3)|\leq T_1$ and $\text{Real}(c_3)<T_2$ then Dark if $|\text{Imaginary}(c_3)/\text{Real}(c_3)|>T_1$ and $\text{Real}(c_3)>T_2$ then Dark While the value of $T_1$ depends on the detailed geometry of the hexon, a preferred value of the threshold $T_1$ is from greater than about 0 to less than about 0.57. An especially preferred value is about 0.07 to about 0.41, with a most especially preferred value of about 0.3. The preferred value of $T_2$ is about 0. In this way either light or dark lines may be separately detected.

Referring to FIG. 1, for orientation 1 of the hexon, the orientation angle $\theta_1$ of the line-like feature measured anti-clockwise from the image horizontal is:

$$\theta_1=\arctan[\text{Imaginary}(c_3)/\text{Real}(c_3)]$$

while for orientation 2 or the hexon, the orientation angle $\theta_2$ of the line-like feature is:

$$\theta_2=\arctan[\text{Imaginary}(c_3)/\text{Real}(c_3)]+\pi/2$$

The angle $\theta$ is a continuous function of $C_3$, giving rise to angles in the interval 0 to 180 degrees, but for exact hexagonal symmetry, the highest accuracy in $\theta$ is obtained near (but not necessarily exactly at) angles of 0, 30, 60, 90, 120 and 150 degrees. In practice, the $\theta$ angles of highest accuracy deviate slightly from these values because the requirement to map the hexon to pixels on a square grid leads to slight distortions of the hexagonal symmetry. For example, in the arrangement shown in FIG. 1, the angles of highest accuracy in $\theta$ are 0, 26.6, 63.4, 90, 116.6 and 153.4 degrees. The estimate of the orientation angle of the line-like feature can also, for instance, be improved by computing the angle as an average of $\theta_1$ and $\theta_2$ weighted by the $|c_3|$ responses of the two orientations of the hexon.

Additionally, when a straight or curved line segment of specified width has been detected it is possible to count the number of pixels in the line segment. By division of the pixel count by the line width it is possible to approximately estimate the length of the line segment. Accordingly, line segments can be selected according to length, for example by requiring the length to fall between two thresholds. Further, by means of suitable choices of hexon as disclosed in co-pending U.S. patent application, Ser. No. 09/897,736, and being entitled DETECTION OF LINES IN IMAGES. For example, a hexon of non-contiguous groups as shown in FIG. 2, it is possible to detect lines with periodic spacing such as dashed lines.

Thus, overall, there are at least seven means of line analysis —$|c_3|$, the line strength metric, $\delta_3$, the line purity metric, $T_1$ and $T_2$, the thresholds determining lightness or darkness of the line, the line orientation, line length, and the size and shape of the pixel group used to form the hexon, which determine the width and continuity of the line to be detected. The size of the pixel group and the size of the associated hexon determine the scale or width of the line that will be detected. The strength metric responds, for instance, to the contrast of the line relative to its surroundings. High contrast leads to a high value of $|c_3|$ and low contrast to a low value of $|c_3|$. The purity metric responds, for instance, to how well defined the line is. Lines with sharp edges yield high values of $\delta_3$, while lines with blurred, ill-defined edges give smaller values of $\delta_3$. It has been found that the $|c_3|$ and $\delta_3$ metrics, along with the $T_1$ and $T_2$ thresholds and the hexon size, can be used in combination to effectively delineate scratches in an image prior to correction. This is because by means of these criteria it is possible to select from the image only line-like structures of a specified lightness relative to their surroundings in conjunction with a specified contrast, line definition and line width.

One of the benefits of the invention, is that it can be used to isolate scratches (etc.) in an image for correction without the labor of having to point out and trace each individual scratch. To do this successfully, one has to differentiate line-like scratches from authentic line-like image details. An embodiment based on the local radial angular transform includes differentiation in these ways:
1. Whether the line is light or dark with respect to its surroundings.
2. How well defined the line is. This is the dependence on $\delta_3$, which generally measures the degree to which the detected object is like a line and not like something else (e.g. a semi-plane). It may be thought of as roughly determining how fuzzy the edges of a line have to be before something is not considered a line.
3. Determining what is the contrast of the line relative to its surroundings. This is the dependence on $|c_3|$, which may be specified for instance as a range between two thresholds.

However, the invention may actually be practiced without reference to the preferred LORA functions when an alternative method of line detection is used.

The method can be practiced as removing line defects from a still image by providing image data in digital form, detecting line defects in the image within a specified range of widths without manually designating the spatial location of the line defects, and adjusting the image data to correct the detected line. It can also be described as a method for removing line defects from a still image by providing image data in digital form, detecting line defects in the image of a specified brightness, either higher or lower, compared to their surrounding without manually designating the spatial location of the line defects, and adjusting the image data to correct the detected line. It may alternatively be described as a method for removing line defects from a still image by providing image data in digital form, detecting line defects in the image of a specified contrast compared to their surroundings without manually designating the spatial location of the line defects, and adjusting the image data to correct the detected line or as a method for removing line defects from a still image by providing image data in digital form, detecting line defects in the image of a specified range of sharpness without manually designating the spatial location of the line defects, and adjusting the image data to correct the detected line.

The invention envisages broad scope for use of the aforementioned quantities for definition of line-like defects such as scratches, cracks or the like. For example, $|c_3|$ or $\delta_3$ or both may be subjected to an upper threshold that must be exceeded at a pixel for it to be marked as a defect requiring correction. Equally, $|c_3|$ or $\delta_3$ or both may be subjected to a lower threshold that cannot be exceeded at a pixel for it to be marked as a defect requiring correction. Additionally $|c_3|$ or $\delta_3$ or both may be required to have values at a pixel lying between two thresholds or outside both thresholds to qualify the pixel as a defect candidate. Alternatively, values of $|c_3|$ or $\delta_3$ or their ranges may be taken from pre-existing tables, for instance representing specific types of commonly occurring defects. Further suitable values or ranges of $|c_3|$ or $\delta_3$ for defining a defect may be selected on the basis of the statistical analysis of the distribution $|c_3|$ or orientation of $c_3$ or the distribution of $\delta_3$ or any, all or several of the aforementioned within the entire image or some region of interest within the image. Defect pixels can also be selected on the basis of whether they are dark or light compared to their surroundings or both. After defect pixels are identified using the LORA method it is also possible to perform supplementary searches, for example using a conventional search for line sections based on identifying three similar contiguous pixels within a 3 by 3 pixel window. Such or similar searches can be helpful in precisely delineating the ends of a scratch when the hexon is large.

The pixels that are members of a defect may be marked by any convenient means known in the art. For example, they may be represented as a list or a mask or by means of flags or by line segment encoding or by run length encoding or by a chain code or by other means. The defect may also be represented by a mathematical function fitted to the location of some or all of the pixels marked as part of the defect.

The size of the pixels groups making up the hexon and the size and form of the hexon itself may be chosen over wide limits as described in the above-identified co-pending U.S. Patent Application bearing attorney's docket number 1202.018US1. The image may be analyzed wit one or more kinds of hexon with identical or different choices for the aforementioned thresholds. Output of the different hexons may be analyzed independently or jointly, optionally in a hierarchy wit respect to scale.

After they have been defined, the defect pixels may be corrected by any method known in the art. For example, the pixel may be replaced by the average or weighted average of pixels in its neighborhood, preferably excluding other defect pixels. The output of a top hat or rolling ball filter may also be used. Non-linear filters such as the median filter or other rank leveling filters may be employed. Adaptive filters are another alternative, such as the double window modified trimmed mean filter described in "Computer Imaging Recipes in C", H. R. Myler and A. R. Weeks, Prentice-Hall, 1993, p. 186ff. The defect may also be corrected by the use of morphological operations such as erosion or dilation, selected on the basis of the lightness or darkness of the defect relative to its surroundings. Combinations of these operations in the form of morphological opening and closing are also possible. The defect may also be removed by interpolation such as by linear or quadratic interpolation. Other interpolation methods, for example such as the trigonometric polynomial technique described on-line by W. T. Strohmer in "A Levinson-Galerkin algorithm for trigonometric approximation" at http://tyche.mat.univie.ac.at/papers/inpress/trigappr.html or the multivariate radial basis technique described on-line by H. Zatschler in "M4R Project—Radial Basis Functions" at http://www.doc.ic.ac.uk/~hz3/m4rproject/m4rproject.html may also be used.

Interpolation may also be accomplished by fitting a surface such as a plane or a parabola to the local intensity surface of the image. In color or multichannel images, information from a defective channel may be reconstructed using information from the remaining undamaged channels. The defect may also be repaired using the method of Hirani as described in A. N. Hirani and T. Totsuka, *Proceedings of SIGGRAPH 96*, 269-276 (1996). Alternatively the repair may be effected by 'inpainting' as discussed in M. Bertalmio, G. Sapiro, V. Caselles, and C. Ballester, "Image Inpainting", *Preprint* 1655, Institute for Mathematics and its Applications, University of Minnesota, December 1999 or by the more recent variational method described in C. Ballester, V. Caselles, J. Verdera, M. Bertalmio and G. Sapiro, "A Variational Model for Filling-In" available on-line at http://www.ceremade.dauphine.fr/reseaux/TMR-viscosite/preprints.html. Additional techniques are described in T. F. Chan and J. Shen, "Morphology Invariant PDE Inpaintings", *Computational and Applied Mathematics Report* 01-15, UCLA, May 2001 and T. F. Chan and J. Shen, "Non-Texture Inpainting by Curvature-Driven Diffusions (CDD)", *Computational and Applied Mathematics Report* 00-35, UCLA, September 2000. After repair, noise may optionally be added to the corrected area to further disguise the correction. The amount of such noise may be predetermined or, for instance, computed from the local or global properties of the image.

While the invention will be described with respect to a specific embodiment, it is understood from the foregoing that other embodiments are possible and will be apparent to those skilled in the art. For clarity the procedure will be described as a series of steps but it will be understood that the order of the steps can be adapted to the needs of the application. For instance, certain steps may be combined or separated into sub-steps.

The following example implementation is designed to remove one- or two-pixel wide scratches, a size chosen as the largest that can be corrected in small images, such as those used the World Wide Web, without disrupting image detail. The shape, size and conformation of the hexon detector that is used is shown in FIG. 1. The top left pixel in the group marked 0 is positioned over the test pixel. The procedure comprises a defect detection phase and a defect correction phase.

Step 1—Initialization

The operator is given a means of specifying whether to remove dark or light scratches or both, for example by means of checkboxes. In the case of a color image the color channels, such as RGB, are converted to a color space in which there is an axis representative of lightness. Suitable color spaces include YIQ, YUV, YES, CIE L*u*v*, CIE L*a*b*, HLS, HSV. For a gray scale image the terms "dark" and "light" are unambiguous. For a color image, however, these terms only have meaning with respect to variation along the lightness axis. Accordingly, the search for the scratch is conducted only in the lightness channel, i.e., in Y, L or V for a color image, even though all channels are corrected. Further, the operator specifies the $\delta_3$ threshold, for instance with a slider or a numeric edit control. A preferred range of this threshold is from about 0.3 to 0.99 with a most preferred range from about 0.5 to 0.9. Within the preferred range of the threshold small differences are not critical. Thus, in practice, the range may be represented by a limited number of thresholds lying in this range. For example, the operator may be allowed to choose from $\delta_3$ thresholds of about 0.7, 0.8 and 0.9. These values may be given numerically, or as a choice of radio buttons or scholastic buttons described, for example, as "aggressive", "normal" and "mild" respectively. A value of about 0.8 may be taken as a default value.

Step 2—Detection

The hexon, both in orientation 1 and orientation 2, is scanned pixel by pixel across the region of interest of the image along its pixel rows and columns. At each position the local radial angular transform is computed and values of $|c_{j3}|$ and $\delta_{j3}$ are derived for the two orientations j. The values of $\delta_{13}$ and $\delta_{23}$ under the two hexon orientations are compared to the $\delta_3$ threshold specified in step 1. If a value does not equal or exceed this threshold the corresponding value of $|c_3|$ is set to zero. The maximum of the two values $|c_{13}|$ and $|c_{23}|$ is then assigned to the test pixel. If only dark or only light scratches have been selected for removal the ratio $|\text{Imaginary}(c_3)/\text{Real}(c_3)|$ and the quantity $\text{Real}(c_3)$ are tested against thresholds $T_1$ of 0.3 and $T_2$ of 0 respectively, as previously described, to see if the lightness criterion is satisfied. If it is not, the pixel is removed from further consideration, for example by assigning it a $|c_3|$ value of zero. At this stage all pixels have $|c_3|$ ranging from zero to $|c_3|_{max}$, the largest response anywhere in the search area.

Step 3—Refinement

The operator adjusts two contrast limits $L_1$ and $L_2$ to further restrict what region of the image is selected as a defect area. Only values of $|c_3|$ satisfying the relationship $L_1 \leq |c_3|_{\leq L2}$, where $0 < L_1 < L_2 \leq |c_3|_{max}$, are considered to represent a defect. To assist the operator it is desirable to mark the selected area of the image. This can be done, for instance, by blinking the pixels or by surrounding them with a "marching ants" selection marquee. However, a preferred way is simply to display the corrected pixels. The operator can then easily judge if all of the defects have been removed and whether the rest of the image remains undamaged and so arrive at an effective setting of $L_1$ and $L_2$.

Step 4—Correction

Correction of the pixels defining the defect is accomplished by placing a window 6 pixels by 6 pixels over each pixel to be corrected. Using a numbering scheme for the pixels of the window running from 1 to 6 and starting at the top left of the window, the window pixel with coordinates (3,3) is placed over the pixel to be corrected. If the image contains more than one channel, each is corrected in the same way. The mean channel value in the window, $C_{mean}$, is computed. A replacement channel value, $C_{repl}$, is calculated for a light defect as the median of those channel values in the window that are less than $C_{mean}$, and for a dark defect as the median of those channel values in the window that are greater or equal to $C_{mean}$. $C_{repl}$ is assigned to any pixel in the window whose channel value exceeds $C_{mean}$ in the case of a light defect, and does not exceed $C_{mean}$ in the case of a dark defect.

What is claimed is:

1. A method for removing line-like defects from an image by providing image data in digital form, analyzing segments of the image data as groups of pixels, detecting line defects in the image by application of a local radial angular transform and adjusting the image data to correct the detected line defects.

2. The method of claim 1 in which the detecting operation detects a line according to at least one characteristic from the group comprising line lightness higher than the surroundings, line lightness lower than the surroundings, line contrast with respect to surroundings, line orientation with respect to the image borders, line edge sharpness, line width or line length.

3. The method of claim 1 wherein the image is a color image.

4. The method of claim 1 wherein the image data is provided in a color space format that includes a brightness value.

5. The method of claim 1 wherein a geometric pattern of groups of pixels is selected and used to detect line-like structures in image data.

6. The method of claim 5 wherein the geometer pattern comprises hexons.

7. The method of claim 4 wherein a geometric pattern of groups of pixels is selected and used to detect line-like structures in image data.

8. The method of claim 7 wherein the geometric pattern comprises hexons.

9. The method of claim 6 wherein the hexons are laid over the image.

10. The method of claim 9 wherein a modulus of a transformation coefficient, $c_3$, is used to indicate the presence of a line-like feature in the image under the hexon.

11. The method of claim 5 wherein brightness differences within the groups of pixels are used to identify line-like features.

12. The method of claim 1 wherein an operator selects a type of line defect to be corrected by selecting from among the group consisting of a) light line defects, b) dark line defects, and c) both light line defects and dark line defects.

13. The method of claim 1 wherein an operator adjusts two contrast limits $L_1$ and $L_2$ to restrict what regions of the image are to be selected as a defect area.

14. The method of claim 1 wherein only values of a lines strength metric, $|c_3|$, satisfying the relationship $L_1 \leq |c_3| \leq L_2$, where $0 < L_1 < L_2 \leq |c_3|_{max}$, are considered to represent a defect, wherein $L_1$ defines a lower contrast limit and $L_2$ defines an upper contrast limit.

15. The method of claim 1 wherein the operator marks a selected area of the image on which to practice the method.

16. The method of claim 1 wherein a threshold value to determine limits on detected line defects to be treated is applied to data from application of a local radial angular transform.

17. A computer containing software and hardware that enables execution of the process of claim 1.

18. The method of claim 1 wherein a value resulting from the application of a local radial angular transform distinguishes the line defect from other line-like features.

19. A method of correcting line-like defects in a single still image without requiring the defects to be manually delineated, the method comprising providing image data in digital form, analyzing segments of the image data as groups of pixels, automatically detecting line defects in the image using a local radial angular transform, and adjusting the image data to correct the detected line defects.

20. The method of claim 19 wherein automatically detecting defects in the image is determined by a program which analyzes for line-like patterns and their relative darkness or lightness with respect to surrounding pixels or surrounding pixel groups.

21. The method of claim 19 wherein automatically detecting defects in the image is determined by a program which analyzes for line-like patterns and their contrast with respect to the surroundings.

22. A method for removing line defects from a still image by providing image data in digital form, detecting line defects by application of a local dial angular transform in the image of a specified range of sharpness without manually designating the spatial location of the line defects, and adjusting the image data to correct the detected line.

23. A computer program product readable by a computer system for executing a computer process that removes line-like defects from an image by providing image data in digital form, analyzing segments of the image data as groups of pixels, detecting line defects in the image by application of a local radial angular transform and adjusting the image data to correct the detected line defects.

24. A computer program product readable by a computer system for executing a computer process that corrects line-like defects in a single still image without requiring the defects to be manually delineated, the computer process comprising providing image data in digital form, analyzing segments of the image data as groups of pixels, automatically detecting line defects in the image using a local radial angular transform, and adjusting the image data to correct the detected line defects.

25. A computer program product readable by a computer system for executing a computer process that removes line defects from a still image by providing image data in digital form, detecting line defects by application of a local dial angular transform in the image of a specified range of sharpness without manually designating spatial locations of the line defects, and adjusting the image data to correct the detected line defects.

26. A method of removing a defect from a digital image, the method comprising:
   defining a geometric pattern of pixel groups in the digital image;
   determining a brightness vector representing mean brightness values associated with each of the pixel groups;
   determining local radial angular transform coefficients based on the brightness vector;
   identifying a presence of a defect within the geometric pattern based on at least one of the local radial angular transform coefficients; and
   adjusting digital image data of the defect to remove the defect from the digital image.

27. The method of claim 26 wherein the at least one of the local radial angular transform coefficients has a non-zero imaginary component and a non-zero real component.

28. The method of claim 26 further comprising:
   determining an angle of the defect using imaginary and real components of the at least one of the local radial angular transform coefficients.

29. The method of claim 26 wherein a defect has a defined type and further comprising:
   evaluating a ratio of an imaginary component and a real component of the at least one of the local radial angular transform coefficients against a defined threshold to determine the defined type of the defect.

30. The method of claim 26 wherein a defect has a defined type and further comprising:
   evaluating a real component of the at least one of the local radial angular transform coefficients against a defined threshold to determine the defined type of the defect.

31. A computer program product readable by a computer system for executing a computer process that removes a defect from a digital image, the method comprising:
   defining a geometric pattern of pixel groups in the digital image;

determining a brightness vector representing mean brightness values associated with each of the pixel groups;

determining local radial angular transform coefficients based on the brightness vector;

identifying a presence of a defect within the geometric pattern based on at least one of the local radial angular transform coefficients; and adjusting digital image data of the defect to remove the defect from the digital image.

32. The computer program product of claim 31 wherein the at least one of the local radial angular transform coefficients has a non-zero imaginary component and a non-zero real component.

33. The computer program product of claim 31 wherein the computer process further comprises:

determining an angle of the defect using imaginary and real components of the at least one of the local radial angular transform coefficients.

34. The computer program product of claim 31 wherein a defect has a defined type and further comprising:

evaluating a ratio of an imaginary component and a real component of the at least one of the local radial angular transform coefficients against a defined threshold to determine the defined type of the defect.

35. The computer program product of claim 31 wherein a defect has a defined type and further comprising:

evaluating a real component of the at least one of the local radial angular transform coefficients against defined threshold to determine the defined type of the defect.

36. The computer program product of claim 23 wherein a value resulting from the application of the local radial angular transform distinguishes the line defect from other line-like features.

* * * * *

UNITED STATES PATENT AND TRADEMARK OFFICE
CERTIFICATE OF CORRECTION

PATENT NO. : 7,218,795 B2
APPLICATION NO. : 09/900479
DATED : May 15, 2007
INVENTOR(S) : Mikhail Ivanovich Trifonov et al.

It is certified that error appears in the above-identified patent and that said Letters Patent is hereby corrected as shown below:

- On the Title Page Item (75), line 4, delete "Kryzstof" and insert -- Krzysztof --, therefor.

- On the Title Page Item (56), line 15, delete "m4project/m4project.html." and insert -- m4rproject/m4rproject.html. --, therefor.

- On the Title Page column 2, line 12, delete "Trigonoetric" and insert -- Trigonometric --, therefor.

- On the Title Page column 2, line 18, delete "199" and insert -- 1999 --, therefor.

- On sheet 2 of 2 of the issued patent, Figure 3, insert -- 1 -- in the far right box of the middle line.

- In column 3 of the issued patent, line 8, delete "turn" and insert -- mm --, therefor.

- In column 4 of the issued patent, line 66, before "and" insert -- bearing attorney's docket number 1202.018US1 --.

- In column 4 of the issued patent, line 67, delete "transtion" and insert -- transform --, therefor.

- In column 5 of the issued patent, line 18, delete "(B superscript 1," and insert -- B subscript 1, --, therefor.

- In column 5 of the issued patent, lines 20-21, delete "transfonn L$\Delta$c" and insert -- transform L $\rightarrow$ c --, therefor.

- In column 5 of the issued patent, line 27, delete "it" and insert -- $\pi$ --, therefor.

- In column 5 of the issued patent, line 28, delete "and." and insert -- and --, therefor.

- In column 5 of the issued patent, line 28, delete "in" and insert -- m --, therefor.

- In column 5 of the issued patent, line 40, delete "|c subscript 3|of" and insert -- |c subscript 3| of --, therefor.

- In column 5 of the issued patent, line 44, delete "|c subscript 3|corresponding" and insert -- |c subscript 3| corresponding --, therefor.

UNITED STATES PATENT AND TRADEMARK OFFICE
CERTIFICATE OF CORRECTION

PATENT NO. : 7,218,795 B2
APPLICATION NO. : 09/900479
DATED : May 15, 2007
INVENTOR(S) : Mikhail Ivanovich Trifonov et al.

It is certified that error appears in the above-identified patent and that said Letters Patent is hereby corrected as shown below:

- In column 5 of the issued patent, line 45, delete "$|c_3|$and $|c_{23}|$may" and insert -- $|c_3|$ and $|c_{23}|$ may --, therefor.

- In column 5 of the issued patent, line 48, delete "$|c_3|$can" and insert -- $|c_3|$ can --, therefor.

- In column 5 of the issued patent, line 51, delete "hexan" and insert -- hexon --, therefor.

- In column 5 of the issued patent, lines 54-56, delete:
"$\begin{array}{c} k=6 \\ |c_k|^2 \\ k=2 \end{array}$"
and insert
-- $\sum_{k=2}^{k=6} |c_k|^2$ --, therefor.

- In column 6 of the issued patent, line 7, delete "darlcness" and insert -- darkness --, therefor.

- In column 6 of the issued patent, line 9, delete "Thresholds" and insert -- thresholds --, therefor.

- In column 6 of the issued patent, line 32, delete "arc tan" and insert -- arctan --, therefor.

- In column 6 of the issued patent, line 37, delete "arc tan" and insert -- arctan --, therefor.

- In column 6 of the issued patent, line 38, delete "$C_3$," and insert -- $c_3$, --, therefor.

- In column 6 of the issued patent, line 60, after "09/897,736," insert -- bearing attorney's docket number 1202.018US1 --.

UNITED STATES PATENT AND TRADEMARK OFFICE
CERTIFICATE OF CORRECTION

PATENT NO. : 7,218,795 B2
APPLICATION NO. : 09/900479
DATED : May 15, 2007
INVENTOR(S) : Mikhail Ivanovich Trifonov et al.

It is certified that error appears in the above-identified patent and that said Letters Patent is hereby corrected as shown below:

- In column 6 of the issued patent, line 66, delete "—$|c_3|$," and insert -- -$|c_3|$, --, therefor.

- In column 8 of the issued patent, line 38, delete "wit" and insert -- with --, therefor.

- In column 8 of the issued patent, line 42, delete "wit" and insert -- with --, therefor.

- In column 10 of the issued patent, line 21, before "ranging" insert -- values --.

- In column 10 of the issued patent, line 27, delete "$|c_3|$satisfying" and insert -- $|c_3|$ satisfying --, therefor.

- In column 10 of the issued patent, line 28, delete "$L_1 \leq |c_3| \leq L_2$," and insert -- $L_1 \leq |c_3| \leq L_2$, --, therefor.

- In column 10 of the issued patent, line 28, delete "$0 < L_1 < L_2 \leq |c_3|_{max}$," and insert -- $0 < L_1 < L_2 \leq |c_3|_{max}$ --, therefor.

- In column 10 of the issued patent, line 34, delete "ail" and insert -- all --, therefor.

- In Claim 6, column 11 of the issued patent, line 12, delete "geometer" and insert -- geometric --, therefor.

- In Claim 14, column 11, line 35, delete "$|c_3|$," and insert -- $|c_3|$, --, therefor.

- In Claim 14, column 11, line 35, delete "$L_1 \leq |c_3| \leq L_2$," and insert -- $L_1 \leq |c_3| \leq L_2$, --, therefor.

- In Claim 14, column 11, line 36, delete "$0 < L_1 < L_2 \leq |c_3|_{max}$" and insert -- $0 < L_1 < L_2 \leq |_3|_{max}$, --, therefor.

UNITED STATES PATENT AND TRADEMARK OFFICE
CERTIFICATE OF CORRECTION

PATENT NO. : 7,218,795 B2
APPLICATION NO. : 09/900479
DATED : May 15, 2007
INVENTOR(S) : Mikhail Ivanovich Trifonov et al.

It is certified that error appears in the above-identified patent and that said Letters Patent is hereby corrected as shown below:

- In Claim 22, column 12, line 1, delete "dial" and insert -- radial --, therefor.

- In Claim 25, column 12, line 24, delete "dial" and insert -- radial --, therefor.

- In Claim 35, column 14, line 10, after "against" insert -- a --.

Signed and Sealed this

Third Day of November, 2009

David J. Kappos
*Director of the United States Patent and Trademark Office*